United States Patent
Song et al.

(10) Patent No.: US 6,518,698 B1
(45) Date of Patent: Feb. 11, 2003

(54) SEMICONDUCTOR LASER CATHODE RAY TUBE FOR DRIVING AT ROOM TEMPERATURE

(75) Inventors: Chung-dam Song, Kyungki-do (KR); Sang-kyun Kim, Seoul (KR); Sang-muk Kim, Kyungki-do (KR); Young-woo Song, Seoul (KR); Moon-gueon Kim, Kyungki-do (KR); Duk-sung Park, Kyungki-do (KR); Jong-sig Choi, Kyungki-do (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/545,186

(22) Filed: Apr. 7, 2000

(30) Foreign Application Priority Data

May 21, 1999 (KR) .......................................... 99-18448

(51) Int. Cl.[7] .................. H01J 29/10; H01L 29/15; H01S 3/00
(52) U.S. Cl. .................. 313/474; 313/366; 313/479; 372/43
(58) Field of Search ................ 313/474, 366, 313/476, 479, 477 R, 2.1, 482; 372/43, 45, 50, 107; 156/272.8, 89.11

(56) References Cited

U.S. PATENT DOCUMENTS

| 4,695,332 A | * | 9/1987 | Gordon et al. | 117/56 |
| 5,374,870 A | * | 12/1994 | Akhekyan et al. | 148/DIG. 12 |
| 5,687,185 A | * | 11/1997 | Kozlovsky et al. | 313/463 |
| 5,807,764 A | * | 9/1998 | Rice et al. | 372/74 |
| 6,266,357 B1 | * | 7/2001 | Feld et al. | 372/45 |
| 6,331,749 B1 | * | 12/2001 | Makienko et al. | 313/2.1 |

* cited by examiner

*Primary Examiner*—Ashok Patel
*Assistant Examiner*—Karabi Guharay
(74) *Attorney, Agent, or Firm*—Lowe Hauptman Gilman & Berner, LLP

(57) ABSTRACT

A semiconductor laser CRT for driving at room temperature, whose target is pumped by an electron beam, in which a laser target is fixed to a beaker-shaped transparent glass support plate, and the glass support plate is sealed with a glass bulb using fused frit glass. Accordingly, there is no cracking of the glass bulb due to a difference in thermal expansion or destroying of a sustained airtight vacuum.

7 Claims, 3 Drawing Sheets

SEMICONDUCTOR LASER CATHODE RAY TUBE FOR DRIVING AT ROOM TEMPERATURE

BACKGROUND OF THE INVENTION

1. Field of the Invention

The present invention relates to a semiconductor laser CRT for driving at room temperature, whose target is pumped by an electron beam.

2. Description of the Related Art

FIG. 1 is a cross-sectional view illustrating the schematic, configuration of a conventional semiconductor laser CRT. As shown in FIG. 1, the laser CRT essentially includes a vacuum glass bulb 3 having a laser target 2 housed at one end of the CRT and an electron gun 4 placed close to the other end thereof. The alignment of the electron beam focusing and deflecting means, i.e., magnets, surrounds the vacuum glass bulb 3 near the electron gun so that an electron beam is focused and projected through the laser target 2. The laser target 2 which is maintained at a high positive potential by a high voltage source (not shown) is housed on the inner surface of a transparent support plate 5 sealed in the end of the glass bulb 3. The laser target 2 is formed with a semiconductor structure, and includes a means for forming an existing Fabry-Perot resonator for sustaining stimulated emission of luminescence. That is, the resonator is formed of a pair of mirrors (not shown), which will be described later.

In the operation of the laser CRT, the high positive potential applied to the laser target 2 causes an electron beam to be attracted to and absorbed by the semiconductor structure of the laser target 2. The electron beam in this semiconductor structure generates electron-hole pairs. When electrons and holes are recombined with each other, they generate radiation. The light amplification by stimulated emission of the radiation depends on the pure gain of the resonator, and essentially generates an optical beam emitted perpendicularly to the surface of the laser target 2. Since the electron beam is incident upon the inner surface of the target at an angle of nearly 90° to the target, the optical beam and the electron beam might be fundamentally considered straight. Thus, the optical beam can be made to scan by scanning the electron beam on the target.

In particular, in the laser CRT of FIG. 1, the transparent support plate 5, onto which the laser target 2 is mounted, is coupled to the glass bulb 3 by a metal ring 8. The metal ring 8 is formed with a structure in which a first covar-ring 8a and a second covar-ring 8b are combined with each other. Here, the first covar-ring 8a has a thermal expansion coefficient similar to that of the glass bulb 3, and is coupled to the glass bulb 3. The second covar-ring 8b has a thermal expansion coefficient that is similar to that of the transparent support plate 5 formed of sapphire or the like, and is coupled to the transparent support plate 5. A low temperature maintaining device 1, i.e., a cryostat, for cooling the laser target 2 is provided together with an auxiliary transparent support plate 6. Also, a vacuum-sealed glass tube 7 is provided to prevent heat transfer between the low temperature maintaining device 1 and the open air. Here, the cover-rings 8a and 8b are coupled respectively to the glass bulb 3 and the transparent support plate 5 by soldering or other methods. FIG. 2 is an exploded perspective view illustrating the covar-rings 8a and 8b disassembled respectively from the glass bulb 3 and the transparent support plate 5.

As shown in FIG. 1, the conventional laser CRT includes the low temperature maintaining device 1, but the low temperature maintaining device 1 is no longer necessary when the existing laser CRT is driven at room temperature. Besides, when the laser target 2 made of a III-V group compound such as GaN is used, a single crystal is directly grown on the transparent support plate 5 by metal organic chemical vapor deposition (MOCVD). Therefore, transparent sapphire plates must be used as the growth support plates 5 and 6 to each of the side surfaces of which the covar-ring 8 is attached. In this case, since the growing temperature in the MOCVD must be 800° C. or more, a metal organic gas and a hydride gas entering a reactor react with the covar-rings. As a consequence, the covar-rings are easily eroded or other compounds are formed on the surfaces thereof, making a covar-to-covar bonding impossible. In contrast with the above, when the covar-rings are attached after the III-V group compound has been grown on the sapphire support plate, the single crystal structure and composition of the grown III-V group compound are destroyed by heat of 1000° C. or more generated upon welding.

Such a covar-ring attaching method is complicated, the covar-ring required for the method is expensive, and airtight maintenance with respect to an internal vacuum is difficult. In particular as for the airtight maintenance, as shown in FIG. 2, even when there is a slight difference between the glass bulb 3 and the covar-ring 8a, the covar-ring 8a is expanded or shrunk excessively lager or smaller than the glass bulb 3 in directions indicated by the arrows, so that the glass bulb 3 is broken or the covar-ring 8a is separated from the glass bulb 3. As shown in FIG. 3, even though the covar-ring 18a is attached to the outer surface of the glass bulb 13 to prevent destroying the glass bulb due to the excessive expansion of the covar-ring, generation of a gap is inevitable.

Also, when the metallic covar-ring is used, the internal voltage of the glass bulb becomes low.

SUMMARY OF THE INVENTION

To solve the above problems, it is an objective of the present invention to provide a semiconductor laser CRT for driving at room temperature by which airtightedness of a glass bulb is achieved by using an adhesive material which substitutes for a metallic covar-ring and has the same thermal expansion coefficient as that of the metallic covar-ring.

Accordingly, to achieve the above objective, there is provided a semiconductor laser cathode ray tube (CRT) for driving at room temperature comprising: a laser target including a semiconductor substrate formed of a semiconductor compound, a front mirror layer formed on the semiconductor substrate, an active layer formed on the front mirror layer, and a rear mirror layer formed on the active layer; a transparent support substrate having the laser target mounted thereon; a glass bulb having an electron gun, for emitting an electron beam, installed therein; and an adhesive material for adhering the edge of the glass bulb to the edge of the transparent support plate.

Preferably, the transparent support plate is made of glass, and the adhesive material is made of frit glass.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
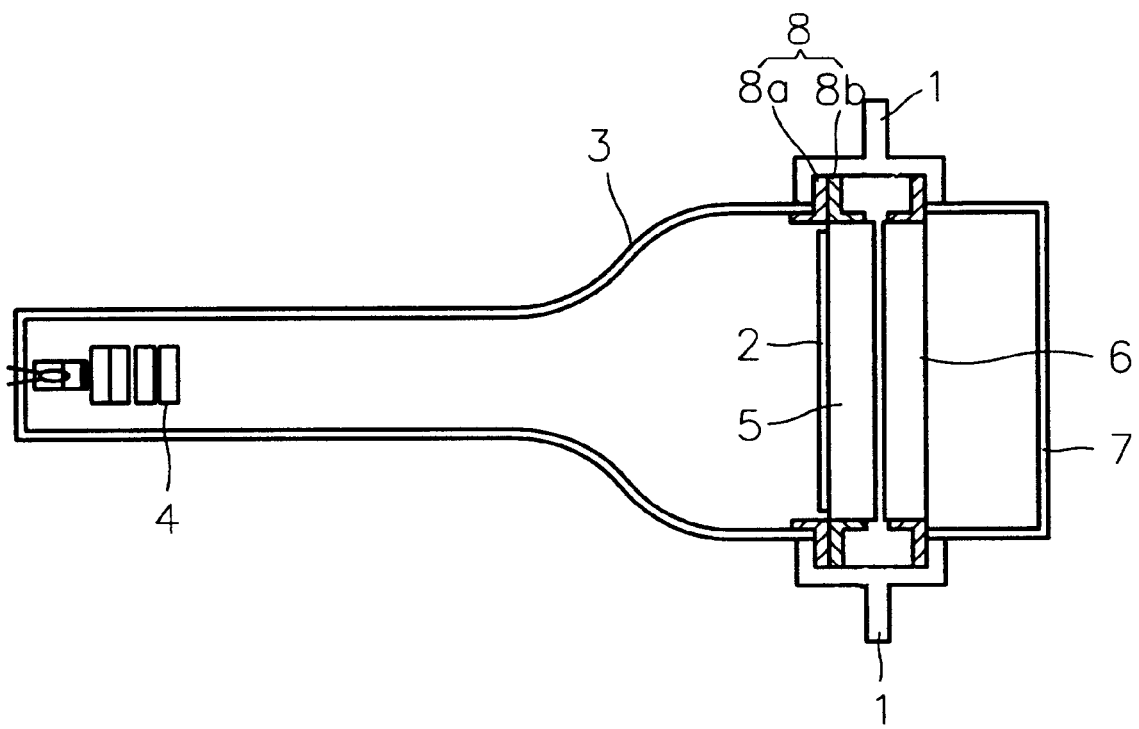
FIG. 1 is a cross-sectional view illustrating the schematic configuration of a conventional semiconductor laser CRT.
Figure 2:
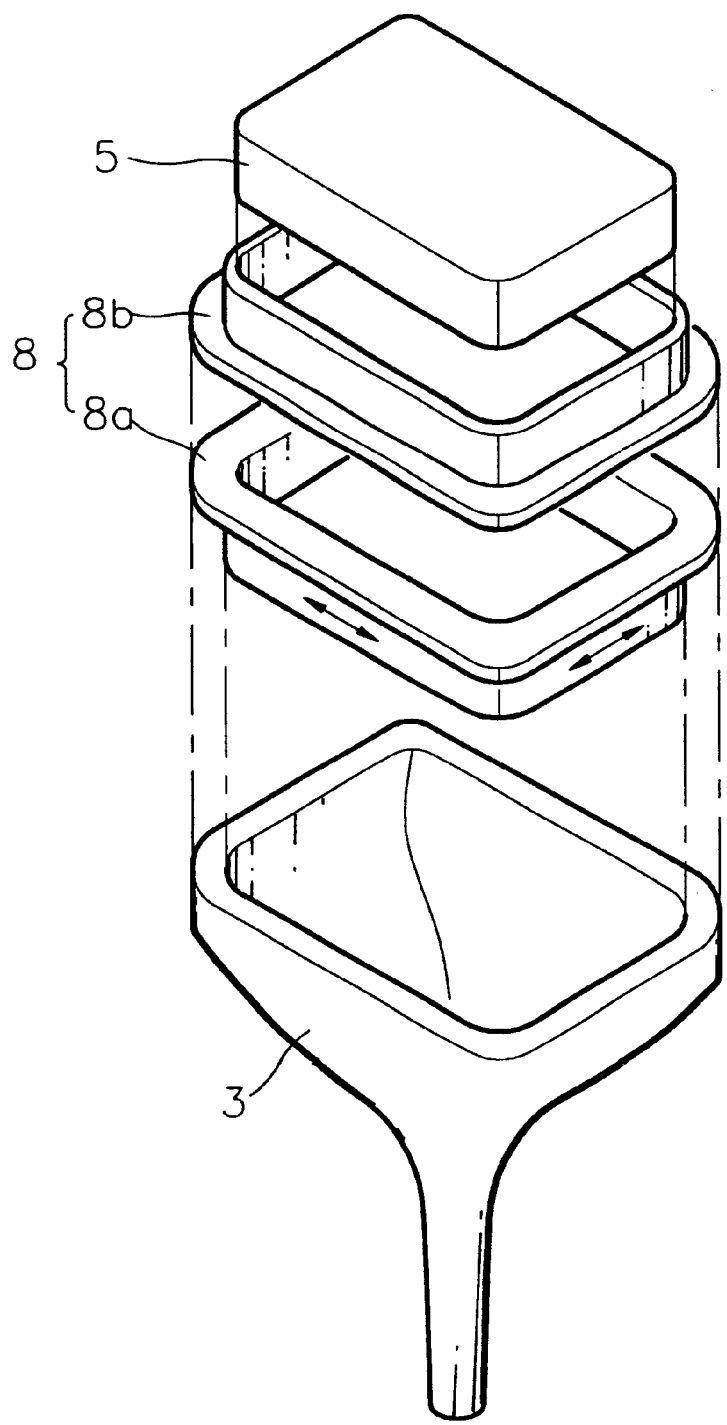
FIG. 2 is an exploded perspective view illustrating some parts of the semiconductor laser CRT of FIG. 1 which are disassembled in the order of assembly.
Figure 3:
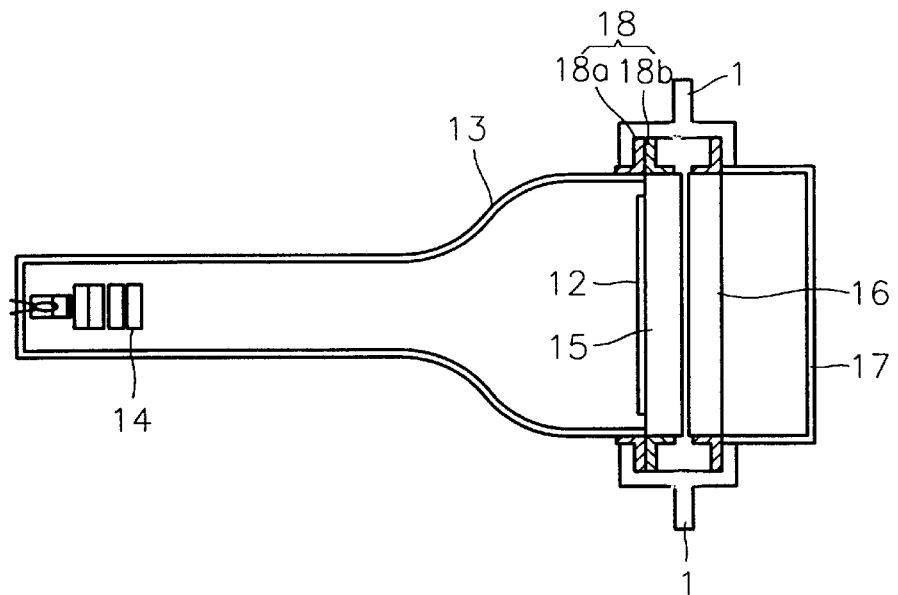
FIG. 3 is a cross-sectional view illustrating the schematic configuration of another conventional semiconductor laser CRT.
Figure 4:
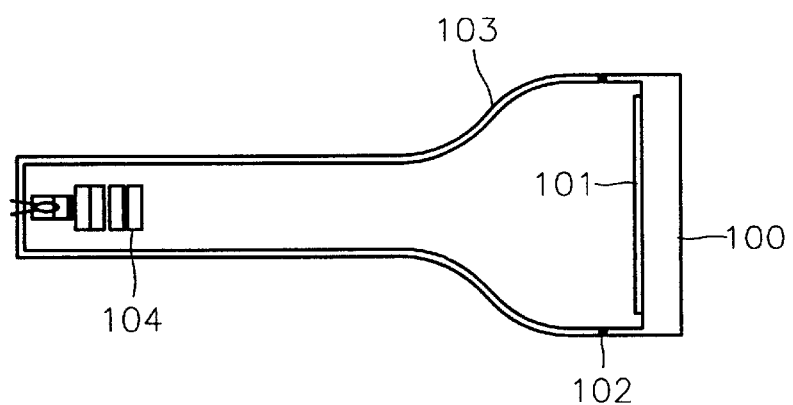
FIG. 4 is a cross-sectional view illustrating the schematic configuration of a room temperature driving semiconductor laser CRT according to the present invention.

Referring to FIG. 4, semiconductor laser CRT for driving at a room temperature according to the present invention has a structure in which a transparent support plate 100 on which a laser target 101 is mounted, is coupled by an adhesive material to a glass bulb 103 having an electron gun 104 built therein. In particular, a glass substrate made of the same material as the glass bulb 103 is used as the transparent support plate 100, and frit glass is used as the adhesive material 102. In this way, the semiconductor laser CRT for driving at room temperature is characterized in that the glass substrate meets with the glass bulb and they are sealed by the frit glass. As described above, cracking due to thermal expansion of destroying of an airtight vacuum is prevented by using a glass material having a similar thermal expansion property to the glass bulb as the transparent support plate 100 and the adhesive material 102.

Figure 5:
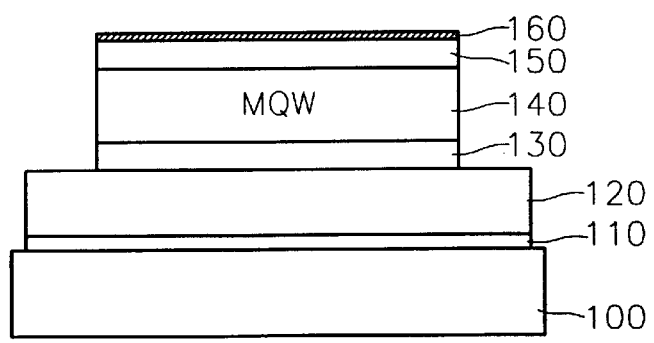
FIG. 5 is a magnified cross-sectional view illustrating the semiconductor target and the glass substrate in the laser CRT of FIG. 4.

Also, a laser target 101 mounted on the transparent support plate 100 has a structure as shown in FIG. 5. That is, the laser target 101 is a semiconductor construction obtained by sequentially stacking a front mirror 130, an active layer 140 having a multi-quantum well (MQW) structure or a super lattice structure, and a rear mirror 150 on a semiconductor substrate 120 formed of a II-VI group or III-V group semiconductor compound. The laser target 101 is attached to the transparent support plate 100 by an adhesive layer 110. Here, it is preferable that the semiconductor substrate 120 has a high permeability to light, and when the semiconductor substrate 120 itself can sufficiently support the stacked layers, the transparent support plate 100 does not necessarily need to be adopted. However, as the laser CRT becomes larger, the necessity for the transparent support plate 100 to support the stacked layers can be regarded as increasing. A metal layer 160 is deposited on the upper surface of the rear mirror 150 to completely reflect light having permeated the rear mirror 150 and simultaneously act as an electrode. The metal layer 160 is not required when at least part of the rear mirror 150 is formed of a metal.

Here, the III-V group semiconductor compound semiconductor substrate 120 is a single crystal layer with a thickness of 5 ($\mu$m) or more which is used as a substrate onto which the front mirror 130, a partial reflection mirror, is comprised of a distributed brag reflector (DBR) having a reflectivity of 95%. The rear mirror 150, a reflection mirror, is comprised of a dichroic mirror having a reflectivity of 100%. In this way, the rear mirror 150 forms a resonator with the dichroic mirror instead of the DBR, which partially overcomes the problems due to a complicated manufacturing method. In some circumstances, the front mirror 130 can also be comprised of the dichroic mirror having a reflectivity of 95%.

As described above, the semiconductor laser CRT for driving at room temperature according to the present invention is driven at room temperature, so that it does not require a low temperature maintaining device. The semiconductor laser CRT has a structure in which a laser target is fixed to a beaker-shaped transparent glass support plate, and the glass support plate is sealed with a glass bulb using fused frit glass. Accordingly, there is no worry about cracking of the glass bulb due to a difference in thermal expansion or destroying of a sustained airtight vacuum. Also, a II-VI group of III-V group semiconductor compound can be irrespectively used as the laser target, and all kinds of know methods can be used as a growth technique. In particular, when the III-V group semiconductor compound is used, a substrate made of sapphire with a thickness of about 340 ($\mu$m), TiC, or the like is used to manufacture an optical device such as a laser diode (LD), a light emission diode (LED), etc. Thus, a directly-grown III-V group semiconductor compound/semiconductor substrate construction is attached to the transparent support plate, thereby securing the maintenance strength depending on the seal for vacuum airtight maintenance and an exhaust air pressure and removing the inconvenience of a process in which a covar-ring must be attached. Therefore, a glass support plate is used instead of the covar-ring and thick sapphire, to shorten the manufacturing process and reduce costs.

What is claimed is:

1. A semiconductor laser cathode ray tube (CRT) for driving at room temperature comprising:

a laser target including a semiconductor substrate formed of a semiconductor compound, a front mirror layer formed on the semiconductor substrate, an active layer formed on the front mirror layer, and a rear mirror layer formed on the active layer;

a transparent support substrate having the laser target mounted thereon;

a glass bulb having an electron gun, for emitting an electron beam, installed therein; and an adhesive material for adhering the edge of the glass bulb to the edge of the transparent support plate.

2. The semiconductor laser CRT for driving at room temperature as claimed in claim 1, wherein the semiconductor substrate is formed of a single crystal having a thickness of 5($\mu$m) or more.

3. The semiconductor laser CRT for driving at room temperature as claimed in claim 1, wherein the transparent support plate is formed of glass, and the adhesive material is frit glass.

4. The semiconductor laser CRT for driving at room temperature as claimed in claim 1, wherein the front mirror layer is formed as a distributed brag reflector.

5. The semiconductor laser CRT for driving at room temperature as claimed in claim 1, wherein the active layer has a multi-quantum well structure.

6. The semiconductor laser CRT for driving at room temperature as claimed in claim 1, wherein the rear mirror layer is formed as a dichroic mirror.

7. The semiconductor laser CRT for driving at room temperature as claimed in claim 1, wherein the semiconductor substrate, the front mirror layer, and the active layer are each formed of a II-VI or III-V group semiconductor compound.

* * * * *